United States Patent Office 3,310,504
Patented Mar. 21, 1967

3,310,504
HYDROXYL-ENDED COPOLYMERS OF AN EPIHALOHYDRIN
Edwin J. Vandenberg, Foulk Woods, Del., assignor to Hercules Incorporated, a corporation of Delaware
No Drawing. Filed June 2, 1965, Ser. No. 460,832
12 Claims. (Cl. 260—2)

This application is a continuation-in-part of my application Ser. No. 298,434, filed July 29, 1963.

This invention relates to polymers having terminal hydroxyl groups and more particularly to lower molecular weight hydroxyl-ended copolymers of epihalohydrins with other oxygen-containing monomers.

High molecular weight polyethers prepared by the polymerization of oxiranes, oxetanes, etc., are well known. However, these polymers contain at best no more than one active hydrogen end group per molecule. In high molecular polymers, including the high molecular copolymers of epihalohydrins with other epoxide monomers disclosed in my Patent 3,158,581, the amount of active hydrogen concentration is so low as to be essentially ineffective as a means of modifying the polymer and in many cases cannot be detected. Obviously, any means by which the active hydrogen content of the polymer molecule can be increased, greatly enhances the utility of the polymer.

Low molecular weight, essentially linear, polymers, as for example polymers having a number average molecular weight ($Mn$) of about 500 to 10,000 with reactive terminal groups are unique materials. Because of their low molecular weight, they have very low viscosity above their softening or melting points. This makes it very easy to mix them with chain-extending agents, fillers, antioxidants, light stabilizers, etc., and results in very easy fabrication, even of complex parts. The reactive end-groups make it possible to build the molecular weight back up (up to an infinite, cross-linked network, if desirable), during or after fabrication by reaction with di- or polyfunctional agents to give excellent mechanical properties. Terminal reactive groups are greatly preferred since the polymer chain, after appropriate chain extension, is of maximum value in obtaining good mechanical properties, whereas dangling chain ends or branches would be present if the reactive groups were not terminal and would not contribute to good mechanical properties. Since the actual amount of reaction in the final chain-extending step is very small, there is very little heat of reaction and very little shrinkage, whereas both of these factors would be excessively large if pure monomer were polymerized directly; in fact, so much so that this approach is usually impractical. Because of this low heat of reaction and low shrinkage, large and/or complex parts and articles can be fabricated accurately and without difficulty.

Lower molecular weight liquid hydroxyl-ended epihalohydrin homopolymers have been produced heretofore. However, prior art polymers of this type have been limited in utility by their high brittle point. It now has been found that copolymers of epihalohydrins and other oxygen-containing monomers have much lower brittle points than these homopolymers. In addition, these copolymers exhibit a much lighter and more desirable color than the prior art homopolymers and have highly reactive end groups. Low molecular weight, hydroxyl-ended copolymers of epihalohydrins and ethylene oxide are particularly desirable, due to their having excellent low temperature properties with little or no sacrifice in solvent resistance, ozone resistance, heat resistance and the like.

Thus, in accordance with this invention, low molecular weight polymers having hydroxyl end groups on both ends of substantial numbers of the polymer molecules can be prepared by cleaving high molecular weight copolymers of epihalohydrin and other oxygen-containing monomers. This cleaving is effected by reacting the copolymer with an organometallic compound of an alkali metal, under certain conditions which will be more fully discussed hereinafter. The comonomer which is polymerized with the epihalohydrin is selected from the group consisting of alkylene oxides, oxetanes and tetrahydrofuranes. The copolymers contain about 10–90% epihalohydrin and the remainder comonomer. The low molecular weight hydroxyl-ended copolymer products of this invention have number average molecular weights of between about 500–10,000, and are predominately double hydroxyl-ended, i.e., a substantial portion (at least about 60%) of the polymer chains have hydroxyl groups at both ends thereof.

The epihalohydrin copolymers of this invention provide an alternate site for cross-linking reactions, i.e., the halogen group. This is particularly advantageous where it is desired to have two different rates of cure, as the hydroxyl groups can be used as one curing site and the halo group as the other. Further, the halogen atom provides an active site for attaching dyes, antioxidants and the like to the copolymers.

A preferred method for preparing the low molecular weight copolymers of this invention is illustrated by the following equations for the cleavage of an epichlorohydrin-ethylene oxide copolymer with an organolithium compound (LiR), wherein abstraction of hydrogens on a carbon atom beta to the ether linkage leads to cleavage. As will be seen, for any given ether linkage in the polymer chain, there are three positions wherein a hydrogen is attached to a carbon beta to the ether linkage, and hence there are three possible chain cleavage reactions, two involving cleavage on the left side of the ether linkage and one involving cleavage on the right side of the ether linkage. The three cleavage reactions involving these three beta hydrogens ($\beta_1$, $\beta_2$ and $\beta_3$) are shown below, for two units in the polymer chain, the remainder of the polymer chain being R' and R" in these equations.

Left side cleavage)

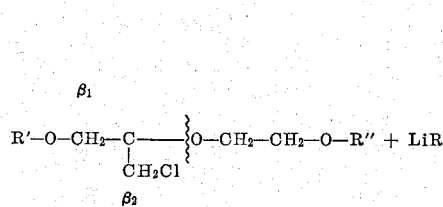

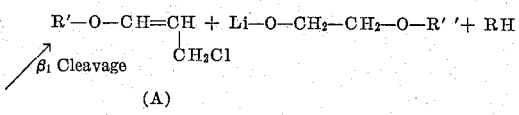

(A)

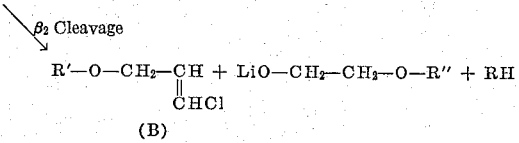

(B)

(Right side cleavage)

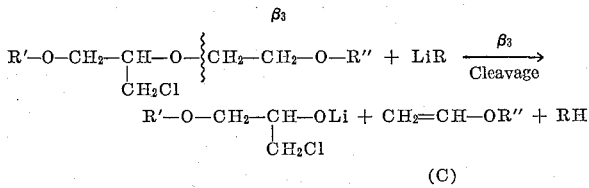

(C)

The lithium alkoxide end groups are readily converted by washing with an active hydrogen compound, such as water, acid, alcohol, etc., to hydroxyl groups. The propenyl end groups (labeled A above) and the vinyl end groups (labeled C above) are very readily converted to a hydroxyl end group by acid washing. The low molecular weight by-product aldehyde (acetaldehyde) and ketone (acetone) are readily water-washed or volatilized out of the product. The allyl end group (labeled B above) would not be removed by mild acid washing as used herein, but surprisingly this type of end group is not found in the cleavage product. Presumably, either the end group isomerizes under the influence of the cleavage agent or LiOR product to form a propenyl ether group (A) which is readily removed by acid hydrolysis, or the end group is removed by cleavage.

Following the hydrolysis of the cleaved copolymers, the lower molecular weight polymers produced generally are predominantly hydroxyl-ended at both ends of the polymer chain. However, two other end groups may also be present, i.e., carbonyl (—C=O) and acetylene (—C≡CH) groups. Although applicant does not wish to be bound to any particular theory, it is believed that these groups are formed as a result of a small number of the following reactions occurring during cleavage (R' and R'' are again the remainder of the polymer chain).

CARBONYL

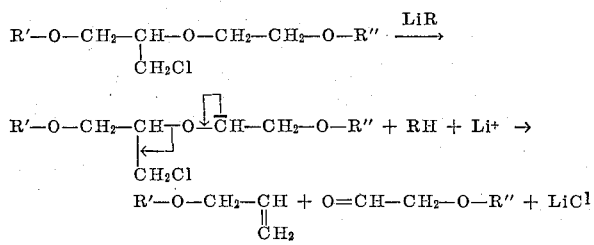

ACETYLENE

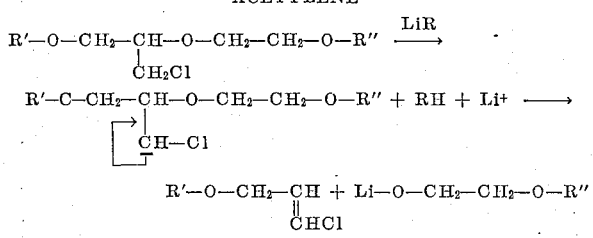

The conversion of the lithium-ended cleaved product to a hydroxyl-ended compound by hydrolysis is illustrated by the following equation:

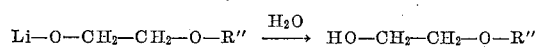

The carbonyl groups can be reduced to primary hydroxyl groups in any convenient manner, such as by means of chemical reducing agents, for example, lithium, sodium or magnesium aluminum hydride, or sodium, lithium, potassium or aluminum borohydride; or preferably by means of conventional catalytic hydrogenation under hydrogen pressure using typical hydrogenation catalysts, including nickel, platinum, palladium, ruthenium, rhodium, and the like, either using these materials as is or on conventional supports. This conversion is illustrated by the following formula:

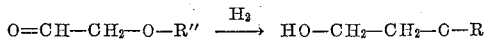

By the proper selection of organometallic cleaving compounds and reaction conditions, in the manner described and illustrated herein, the presence of undesirable acetylene groups can be eliminated or at least minimized. Further, the acetylene-free portion of the polymer can be separated from the portion which contains acetylene end groups either by thin layer chromatography (T.L.C.) or by conventional chromatography techniques. In either case, such materials as silver nitrate, copper salts, such as cupric chloride, and mercury salts (mercuric), on appropriate chromatographic supports, such as kieselguhr, silica gel or aluminum oxide, are used. In conventional chromatography, a solution of the polymer is passed through a bed of the support containing the silver nitrate or the like. The thin layer chromatography technique will be illustrated in the following specific examples. The polymer chains containing acetylene groups can also be reduced or removed by solvent fractionation. This technique will also be illustrated in the following specific examples.

As pointed out above, it is essential that there be at least one hydrogen attached to a carbon beta to the ether group in order for the polymer to be cleaved in accordance with this invention to produce reactive end groups on both ends of the polymer chain. Since a product having OH groups on both ends of the polymer chain is desired, a further requirement is that the polymer being cleaved must be of such a nature that it is possible to isomerize the initially formed double bond end group into conjugation with the ether group to which it is attached. This requires at least one isomerization path to the ether oxygen atom in which every carbon bears at least one hydrogen atom. Thus, while a polymer which has $\beta$ hydrogens but otherwise has fully substituted main chain carbons can be cleaved by the process of this invention, and the product will have reactive end groups, it is not always possible to hydrolyze all of the unsaturated end groups so as to produce only polymers with —OH groups at both of their ends.

Thus, any epihalohydrin polyether copolymer containing monomer units in the polymer chain having at least one hydrogen in the beta position to the ether group can be cleaved to produce a polymer having reactive groups on both ends of the polymer chain. Those copolymers having in addition at least one hydrogen on each carbon between the ether group and any double bond formed on cleavage of the copolymer can be used to produce the double hydroxyl-ended copolymers of this invention.

Those polyethers which can be cleaved to produce the double hydroxyl-ended lower molecular weight polymers of this invention will contain sequences of at least 2 and preferably at least 5 monomer units having the following general formula:

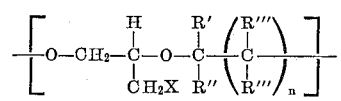

where R' is H, alkyl, alkenyl, haloalkyl, cycloalkyl, aryl, aralkyl, alkoxyalkyl, aryloxyalkyl, alkenyloxyalkyl, alkenylaryloxyalkyl; R'' and each R''' are any one of H, alkyl, alkenyl, alkoxyalkyl, alkenyloxyalkyl, haloalkyl, or alkenylaryloxyalkyl; or any two of R', R'' and R''' can together form a cyclic structure; at least one of said R', R'' and R''' groups in each of said monomer units in said sequences providing a hydrogen attached to a carbon in the beta position to each O atom, and at least one of either R' or R'', and at least one R''' being hydrogen; X is a halogen atom selected from fluorine, chlorine, bromine and iodine; and $n$ is any whole number of 1 or more and preferably is 1 to 4. When $n$ is greater than 1, each repeated R''' may be the same as or different from any preceding R'''.

Examplary of the polymers that can be cleaved to produce the products of this invention are the copolymers of epihalohydrns such as epifluorohydrin, epibromohydrin, epiiodohydrin, and preferably epichlorohydrin, with other monomers such as the alkylene oxides, for example, ethylene oxide, propylene oxide, isopropyl ethylene oxide, butene-1 oxide, cis- and trans-butene-2 oxide, dodecene-1 oxide, hexadecene-1 oxide, octadecene-1 oxide, and other alkylene oxides having 1–20 carbon atoms; the oxetanes, for example, trimethylene oxide, 2- and 3-methyl, ethyl, propyl, isopropyl, butyl, etc., oxetanes, 2,3-dimethyl oxetane, 2- and 3-phenyl oxetanes, 2- and 3-benzyl oxetanes, 2- and 3-cyclohexyl oxetanes, 2- and 3-methoxy methyl oxetanes, and the like; and the tetrahydrofuranes such as tetrahydrofurane, 2-, 3- and 4-methyltetrahydrofurane, 2,3-dimethyltetrahydrofurane, 2,3,4-trimethyltetrahydrofurane, 2,3-diethyltetrahydrofurane, 2,3-diphenyltetrahydrofurane and the like.

Comonomers which produce epihalohydrin copolymers having particularly good rubber properties are alkylene oxides such as ethylene oxide, propylene oxide, 1- or 2-butene oxides, etc.; alkyl glycidyl ethers such as methyl glycidyl ether and the like; trimethylene oxide and tetrahydrofurane. Comonomers with bulky side chains yield copolymers which are more rigid and are useful where products with greater stiffness and hardness are required. The cyclic monomers such as styrene oxide and cyclohexene oxide are examples of this latter type of monomer.

Copolymers of epichlorohydrin and ethylene oxide are of particular importance, because of their excellent solvent resistance, aging properties and their superior chain flexibility.

Preferably the polymer that is cleaved will be one of fairly high molecular weight so that the original end groups in the polymer being cleaved are an insignificant portion of the total final end groups. The major portion of the individual polymer molecules in the cleaved product will then have hydroxyl end groups on both of their ends. The polymer being cleaved will preferably have a chain of at least about 100 of said monomer groups and more preferably at least about 500. The actual molecular weight of the polymer being cleaved and the number of cleavages per polymer molecule will, of course, depend on the purpose for which the final polymer is to be used.

The cleavage process used to produce the polymers of this invention is carried out by reacting the above-described polymers with an organometallic compound of an alkali metal. Any organometallic compound of an alkali metal, i.e., lithium, sodium, potassium, rubidium or cesium, can be used. The organo moiety will preferably be a hydrocarbon group as, for example, an alkyl, aryl, alkenyl, alkynyl, cycloalkyl, cycloalkenyl, or aralkyl, etc., group. Exemplary of the alkali metal organometallic compounds that can be used are methyllithium, ethyllithium, isopropyllithium, n-butyllithium, isobutyllithium, tert-butyllithium, amyllithium, decyllithium, octadecyllithium, cyclohexyllithium, cyclohexenyllithium, phenyllithium, naphthyllithium, vinyllithium, lithium acetylide, methylsodium, ethylsodium, propylsodium, isopropylsodium, the butyl sodiums, amylsodium, dodecylsodium, benzylsodium, isopropenylsodium, allylsodium, octadecenylsodium, butadienylsodium, isoprenylsodium, butylrubidium, butylcesium, methyl-, ethyl-, propyl- and butylpotassium, allylpotassium, octylpotassium, phenylpotassium, cyclopentrylpotassium, cyclohexenylpotassium, etc. Other types of cleaving compounds, such as alkali metal alkoxides and phenoxides, for example, sodium or lithium methoxide, ethoxide, isopropoxide, or n- or t-butoxide, or sodium or lithium phenoxide and even alkali metal hydroxides such as sodium hydroxide can also be used to produce the cleaved polymers of this invention. Appropriate solvents such as dimethylsulfoxide, acetone, tetrahydrofurane, dioxane, benzene, toluene and the like are used with the alkoxide cleaving agents, with the particular solvent used depending upon which alkoxide is used. The amount of the cleaving compound used will depend upon the amount of cleavage desired, one molecule of the cleaving compound being required for each cleavage, i.e., per two chain ends. Thus, the amount of cleaving compound can vary from about 1% up to a large excess, as for example, 5 to 10 times the weight of the polymer being cleaved, but preferably will vary from about 1% to about 100% by weight of the polymer being cleaved. If the polymer being cleaved has groups reactive to these cleaving compounds, as for example, hydroxyl, ester, etc., groups, then the amount of cleaving compound used must be in excess of this requirement.

The cleavage process can be carried out in the absence of a diluent, i.e. a bulk process, but preferably is carried out in a diluent which may be a solvent for the polymer being cleaved or which may serve only as a dispersant for the polymer. Any organic liquid diluent that is inert under the reaction conditions can be used as, for example, aromatic hydrocarbons such as benzene, toluene, xylene, etc., aliphatic and cycloaliphatic hydrocarbons such as hexane, n-heptane, cyclohexane, etc., and mixtures of such hydrocarbons as, for example, petroleum ether, gasoline, etc. Diluents that are capable of reaction with the organometallic compound, as for example, ethers, can also be used provided that the rate of reaction of the organometallic with the polymer being cleaved exceeds the rate of reaction with the diluent. The concentration of the polymer in the diluent can vary from a fraction of 1% up to an essentially diluent-free system. As already mentioned, the polymer can be dissolved in the diluent or a slurry of the polymer in a diluent can be used. Generally, it is preferred to use conditions such that the polymer solution or dispersion is stirrable. Usually the polymer concentration will be in the 2 to 50% range. As noted above, the process can be operated in the absence of a diluent, particularly in the case of polymers which on cleavage become more and more fluid, or by carrying out the process in an extruder, after which the cleaved fluid product can be handled in more conventional equipment in a continuous process.

The cleavage of the epihalohydrin copolymers can be carried out over a wide temperature range, generally from about −150° C. to about 200° C., depending on the reactivity of the polymer and the organometallic compound, the stability of the organometallic compound, etc. Preferably, the reaction is carried out at a temperature of from about −120° C. to about 150° C., and more preferably from about −100° C. to about 75° C. The pressure can be atmospheric, subatmospheric or above atmospheric, as desired. In fact, pressures up to several thousand pounds can be used if needed to keep the diluent in the liquid state.

Through the use of the above-described cleavage reaction a polymer having hydroxyl groups on both ends of the polymer chain can be obtained, provided the proper isolation procedure is also used. Thus, appropriate isolation conditions must be used to hydrolyze off the double bond or vinylene end groups, i.e. the propenyl, isopropenyl, vinyl or other vinylene, vinylidene, etc. or ether end groups. This is very readily accomplished in the case of the propenyl or vinyl ether end groups by simply washing the reaction mixture after the cleavage reaction with a weak acid solution, as, for example, dilute hydrochloric acid, formic acid, acetic acid, oxalic acid, sulfuric acid, surfurous acid, nitric acid, sulfonic acid, carbonic acid, etc. In the case of the propenyl end groups, more drastic hydrolysis conditions are sometimes required, as for example, the use of a higher acid concentration and elevated temperatures. Carbonyl end groups and acetylene end groups are removed from the cleaned copolymer in the manner heretofore described.

The hydroxyl chain-end copolymers of this invention can have molecular weights of from a few monomer units per molecule up to any desired chain length. In general, they will have a number average molecular weight of from about 500 up to about 10,000 and preferably from about 1,000 to about 5,000.

The copolymer products of this invention are substantially double hydroxyl ended. Thus, at least about 60%, preferably at least about 80%, and more preferably at least about 90%, of the polymer chains have hydroxyl groups at both ends thereof (i.e., they are double hydroxyl-ended chains). The remaining chains contain no hydroxyl groups or can be monohydroxyl ended; however, a low monohydroxyl-ended chain content is preferred. Both the high copolymer starting materials and the cleaved double hydroxyl-ended copolymers of this invention can contain from about 10% to about 90% by weight of epihalohydrin and about 90–10% of the comonomer. They preferably contain about 20–80% epihalohydrin. The term "copolymer" as used herein is intended to cover those polymers wherein the various monomer units occur in substantial sequences (i.e., about 5–20 monomer units) of one monomer unit followed by substantial sequences of repeated second monomer units (the so-called "block copolymers"), as well as those polymers wherein the monomer units are interspersed in random fashion. The term "copolymer" is also intended to cover terpolymers and interpolymers wherein more than one of the above comonomers is used.

The high molecular weight polyethers that are cleaved to form the low molecular weight hydroxyl-ended polymers of this invention can be prepared by any desired means. Crystalline and amorphous polyether copolymers of high molecular weight are readily prepared according to the process of my patent U.S. 3,135,705, issued June 2, 1964. Thus, an organoaluminum compound reacted with water and preferably with both water and a chelating agent can be used as the catalyst. A typical catalyst preparation is carried out by reacting a solution of the organoaluminum compound, as, for example, triisobutylaluminum, in a mixture of n-heptane and ether as solvent, with an equimolar amount of acetylacetone as chelating agent and with 0.5 mole of water per mole of aluminum and agitating the mixture at 30° C. for 16 to 20 hours. The polymerization is typically carried out by injecting the catalyst solution so prepared into a solution of the epoxide in an inert diluent and agitating the mixture at room temperature or at elevated temperatures for several hours. Isolation of the polymer will depend on the solubility of the polymer in the reaction diluent, etc.

The following examples illustrate the preparation of the hydroxyl-ended polymers of this invention. All parts and percentages are by weight unless otherwise indicated. All examples were run under a nitrogen atmosphere. The molecular weight of the polymers is indicated by their reduced specific viscosities (RSV). By the term "reduced specific viscosity" is meant $\eta_{ps/c}$ determined on a 0.1% solution in 97% α-chloronaphthalene-3% acetylacetone at 100° C. unless otherwise indicated. The number average molecular weight (M$n$) was determined in benzene (heating to dissolve the polymer when necessary) using a Mechrolab osmometer. The calculated M$n$ was calculated from the hydroxyl analysis assuming 2 hydroxyls per chain. Hydroxyl analysis was determined by infrared analysis in dichloromethylene using 2-chloroethanol as the reference, and carbonyl analysis was determined based on average absorptivity based on chloroacetone and propionaldehyde.

*Example 1*

Forty parts of an epichlorohydrin-ethylene oxide copolymer (69.5% by weight epichlorohydrin), RSV=5.7, containing a small amount of Topanol CA stabilizer, is dissolved in 2600 parts of dry toluene, and this solution is cooled to −74° C. Then 2.8 parts of methyllithium in 50 parts of diethyl ether is added dropwise over a period of 15 minutes, with stirring. The reaction mixture is stirred for 5 hours at −75° C.; then 500 parts of 10% aqueous hydrogen chloride is added, and the mixture allowed to warm to room temperature, with continued stirring. The reaction mixture is then washed neutral with water, filtered, the solvent stripped off, and the product dried.

The product is 81% conversion of a viscous liquid having a number average molecular weight (M$n$) of 1650. Infrared analysis shows 0.83% hydroxyl end groups, 0.30% acetylene end groups and 1.2% carbonyl end groups (M$n$ calculated of 1930).

The carbonyl end groups of this product are reduced by mixing 30.8 parts of the product with 450 parts of tetrahydrofurane under a nitrogen atmosphere, adding thereto 20 parts of a 1 molar solution of lithium aluminum hydride in tetrahydrofurane, with stirring, continuing the stirring for about one hour, then adding 20 parts of water, stripping off the tetrahydrofurane, adding 500 parts of toluene, washing twice with a 3% aqueous solution of hydrogen chloride, washing neutral with water and drying. The product is 28.8 parts of a viscous liquid having an M$n$ of 1812. Infrared analysis shows 1.3% hydroxyl end groups, 0.26% acetylene end groups and no detectable carbonyl end groups (M$n$ calculated of 2320). After this reduction of the carbonyl end groups, 78% of the polymer chains are double hydroxyl ended.

In order to remove the acetylene-ended polymer chains, a thin layer chromatographic plate is prepared by slurrying a mixture of acid alumina and 12% plaster of Paris in water to give a paste. This paste is spread in a thin film (in T.L.C. fashion) on a glass plate, dried at 105° C. for about one hour, and cooled. Then a 5% solution of silver nitrate in methanol with a small amount of acetonitrile is sprayed on the coated plate and dried. A sample of the above carbonyl-free product, 0.05 part of product dissolved in methylene chloride, is spotted onto the plate, the solvent evaporated, and the bottom portion of the plate (about ¼ inch) is immersed in a mixture of methanol and benzene (25% methanol) for about 30–50 minutes. The portion of the product on the upper half of the plate is removed and extracted with hot methylene chloride to recover 70% conversion of a product which contains 1.4% hydroxyl groups and no acetylene end groups by infrared analysis. The product has more than 90% double hydroxyl-ended polymer chains.

*Example 2*

A second sample of the carbonyl-free intermediate product of Example 1 is treated in a chromatographic column for separation of the polymer chains having acetylene end groups, as follows. Kieselguhr G is sprayed with a 5% solution of silver nitrate in methanol containing a small amount of acetonitrile and dried to give a support containing 7% silver nitrate. This support is placed in a 6 x ⅜ inch chromatographic column (3–4 inch bed) and 0.1 part of the carbonyl-free product of Example 1 in benzene is passed therethrough. The product from the column analyzes 1.25% hydroxyl end groups and no detectable acetylene or carbonyl end groups. This product is more than 90% double hydroxyl ended.

*Example 3*

A third sample of the carbonyl-free product of Example 1, consisting of two parts thereof dissolved in 9 parts of toluene, is slowly mixed with 68 parts of n-heptane, with stirring. The supernatant is decanted off and the insoluble product washed twice with heptane and dried. The product is 1.94 parts of a clear, light yellow liquid which shows 1.2% hydroxyl, 0.18% acetylene and no detectable carbonyl end groups by infrared analysis.

*Example 4*

Two parts of an epichlorohydrin-ethylene oxide copolymer (40% by weight and 25 mole percent epichlorohydrin) containing a small amount of Topanol CA stabilizer, RSV=4.9, is dissolved in about 130 parts of dry benzene. Then 0.41 part of n-butyllithium in 2.5 parts of n-hexane is added, with stirring, at 30° C. After further stirring for one-half hour, 0.8 part of anhydrous ethanol is added to shortstop the reaction, and the stirring is continued for 15 minutes. The reaction mixture is then washed with 50 parts of a 10% aqueous solution of hydrogen chloride, stirred for 15 minutes, and then washed neutral with water. The benzene layer is centrifuged to remove a trace of insoluble material, and then stripped and dried, to yield 0.57 part of cleaved copolymer product containing 43.3% epichlorohydrin, by chlorine analysis. The product has an $Mn$ of 2280 (corrected for the stabilizer (Topanol CA) found in the polymer). Infrared analysis shows 1.7% hydroxyl (corrected for the stabilizer), 0.8% acetylene and 0.6% carbonyl end groups ($Mn$ calculated from end groups of 1410). The carbonyl end groups of the products are reduced by the following procedure. The product is treated with lithium aluminum hydride in tetrahydrofurane for one hour at room temperature, water is added, the tetrahydrofurane is stripped off, and toluene added. The polymer is then washed with a 3% aqueous solution of hydrogen chloride, washed neutral with water and dried. The product of the above treatment is then passed through a chromatographic column, as described in Example 2, to remove the acetylene group ended polymer chains.

The final product has 2.1% hydroxyl, and no detectable carbonyl or acetylene groups, by infrared analysis. This product is more than 80% double hydroxyl ended.

The water washes from the above isolation are combined, dialyzed neutral, stripped and dried, to yield 0.1 part of product, containing 15.8% epichlorohydrin. This product has an $Mn$ (in methanol) of 538. Infrared analysis shows 7.6% hydroxyl, 0.3% acetylene and <0.5% carbonyl end groups ($Mn$ calculated of 450). This fraction is 99% double hydroxyl ended.

*Example 5*

The procedure of Example 4 is duplicated exactly except that the starting material is 2 parts of an epichlorohydrin-ethylene oxide copolymer (20.9% by weight and 10 mole percent epichlorohydrin), RSV=4.3 (containing a small amount of Topanol CA stabilizer).

The benzene-soluble product is 0.19 part of cleaved copolymer product containing 30% epichlorohydrin, by chlorine analysis. The product has an $Mn$ of 994. Infrared analysis shows 3.1% hydroxyl, 2.0% acetylene, and 1.0% carbonyl end groups ($Mn$ calculated from end groups of 670). After reduction of the carbonyl groups and removal of the acetylene groups by the procedure used in Example 4, the product has 85% double hydroxyl-ended polymer chains. It contains 4.0% hydroxyl groups.

The water-soluble fraction is 0.59 part of product containing 5.2% epichlorohydrin. This product has an $Mn$ of 1860. Infrared analysis shows 1.7% hydroxyl, 0.3% acetylene and 0.5% carbonyl end groups ($Mn$ calculated of 1550). Following the reduction of the carbonyl groups and removal of the acetylene groups of this product by the above procedure, it has 1.9% hydroxyl groups and 95% double hydroxyl-ended polymer chains.

*Example 6*

Forty parts of an epichlorohydrin-ethylene oxide copolymer (69.5 weight percent and 50 mole percent epichlorohydrin), RSV=5.7, (containing a small amount of Topanol CA stabilizer) is dissolved in 2600 parts of dry toluene, and this solution is cooled to −74° C. Then 8.2 parts of n-butyllithium dissolved in 50 parts of n-hexane is added dropwise over a period of 15 minutes, with stirring. This reaction mixture is stirred for 6 hours at −72 to −77° C., and 10.5 parts of acetic acid is then added to shortstop the reaction. Stirring is continued for about 45 minutes. The reaction mixture is allowed to settle overnight.

A portion of the reaction product supernatant is worked up by washing with 0.03% aqueous sodium bicarbonate until the washes do not change in pH. The solvent is then stripped off and the product dried to yield 1.42 parts (56% conversion) of a viscous liquid. This product has an $Mn$ of 689 (corrected for Topanol). Infrared analysis shows 2.4% hydroxyl, 0.38% acetylene and 4.1% carbonyl end groups ($Mn$ calculated of 660). Following reduction of the carbonyl groups and removal of the acetylene groups by the procedure of Example 4, more than 95% of the polymer chains have hydroxyl groups at both ends. This product contains 5.0% hydroxyl groups by infrared analysis.

Another portion of the reaction product is worked up by washing the settled insoluble phase with toluene, combining the toluene phases, stirring 20 minutes with 500 parts of 10% aqueous hydrogen chloride, washing neutral with water, stripping and drying. The product is 23.8 parts (70% conversion) of a viscous liquid, having an $Mn$ of 1510. Infrared analysis shows 0.7% hydroxyl, 0.5% acetylene and 1.1% carbonyl end groups ($Mn$ calculated of 1990). Following reduction of the carbonyl groups and removal of the acetylene groups of this product by the above procedure, it has 1.6% hydroxyl groups by infrared analysis, and is more than 90% double hydroxyl ended.

The toluene-insoluble material separated during the entire run, after dialyzing free of water solubles, is 0.15% of a tough rubber.

*Example 7*

Two parts of the copolymer used in Example 6 are dissolved in about 130 parts of dry toluene and about 1.35 parts of diethyl ether. To this solution is added 0.41 part of n-butyllithium in about 2.5 parts of n-hexane, with stirring at 0° C. After stirring this reactiton mixture for 2 hours, 1.0 part of acetic acid is added to shortstop the reaction, and the stirring is continued for 30 additional minutes. Fifty parts of 10% aqueous hydrogen chloride is then added, the mixture stirred for 15 minutes, the insoluble product separated, the solution washed neutral with water, filtered, stripped and dried. The product is 1.37 parts (69% conversion) of a viscous mass having an $Mn$ of 4670. Infrared analysis shows 0.25% hydroxyl, 0.20% acetylene, and 0.53% carbonyl end groups ($Mn$ calculated of 4870). After reduction of the carbonyl groups and removal of the acetylene groups by the procedure of Example 4, this product has more than 95% double hydroxyl-ended polymer chains. It contains 0.60% hydroxyl groups.

*Example 8*

This example is similar to Example 6 except that the reaction vessel is initially charged with about 1400 parts of dry toluene, and then 40 parts of the copolymer dissolved in about 1200 parts of dry toluene are added to the reaction vessel over a period of about 4 hours. After 10% of the copolymer has been added, addition of the n-butyllithium is commenced and carried out over a period of 4 hours. After stirring for two additional hours at −76° C., 21 parts of acetic acid are added, and the stirring is continued for 1½ hours while warming the reaction mixture to room temperature. The reaction mixture is allowed to settle overnight, and the toluene supernatant is combined with toluene washes of the small amount of toluene-insoluble product produced. This toluene-soluble portion of the product is stirred twice with 5% aqueous sodium bicarbonate, washed neutral with water, stripped and dried to yield 28.4 parts (71% conversion) of a viscous liquid. This product has an $Mn$ of 585. Infrared analysis shows 2.8% hydroxyl, 0.51% acetylene and 4.5% carbonyl end groups (Mn calculated of 580). After reduction of the carbonyl end groups and removal of the acetylene end groups in the manner described in Example 4, this product has 5.5% hydroxyl groups by infrared analysis and is more than 98% double hydroxyl ended.

*Example 9*

The procedure of Example 6 is repeated in this example, except that the starting material is an epichlorohydrin-ethylene oxide copolymer (40 weight percent and 25 mole percent epichlorohydrin), RSV=1.4, (containing a small amount of Topanol CA stabilizer) and the reactiton is stopped with 21 parts of acetic acid dissolved in 64 parts of anhydrous ethanol. The toluene supernatant portion of the reaction product is worked up by the same procedure used in Example 6, and yields 26% conversion of a viscous liquid, having an $Mn$ of 911. Infrared analysis shows 2.1% hydroxyl, 0.56% acetylene and 1.4% carbonyl end groups ($Mn$ calculated of 1000). After reduction of the carbonyl end groups and removal of the acetylene end groups in the manner described in Example 4, this product has more than 95% double hydroxyl-ended polymer chains. It analyzes 3.0% hydroxyl groups by infrared analysis.

Another portion of the reaction product of this example is worked up by washing twice with 5% aqueous sodium bicarbonate, washing neutral with water, stripping and drying. This product (40% conversion) is a viscous liquid having an $Mn$ of 1900. Infrared analysis shows 0.83% hydroxyl, 0.54% acetylene and 0.26% carbonyl end groups ($Mn$ calculated of 2500). After reduction of the carbonyl groups and removal of the acetylene groups in the above manner, this product has 1.0% hydroxyl groups and is more than 80% double hydroxyl ended.

*Example 10*

The procedure of Example 6 is repeated in this example except that 11.4 parts of phenyllithium in 18 parts ether and 36 parts benzene is substituted for the n-butyllithium used in Example 6. The reaction is carried out for 5 hours at $-75°$ C., and 500 parts of 10% aqueous hydrogen chloride is then added, and the reaction mixture allowed to warm to room temperature, with stirring. The reaction mixture is then washed neutral with water, filtered, stripped and dried. The product is 64% conversion of the starting polymer, and is a viscous liquid, having an $Mn$ of 1230. Infrared analysis shows 1.2% hydroxyl, 0.15% acetylene, and 1.8% carbonyl end groups ($Mn$ calculated of 1420). After reduction of the carbonyl end groups and removal of the acetylene end groups by the procedure of Example 4, infrared analysis of the product shows 2.3% hydroxyl groups, and the product is more than 90% double hydroxyl ended.

*Example 11*

The procedure of Example 6 is again repeated, using 4 parts of the epichlorohydrin-ethylene oxide copolymer of that example as the starting material, and 0.82 part of n-butyllithium as the cleaving agent. The reaction time is 5½ hours, and the reaction temperature is $-75°$ C. After the reaction time has elapsed, 500 ml. of 10% aqueous hydrogen chloride is added, and stirred with the reaction mixture while it is warmed to room temperature. The reaction mixture is then washed neutral with water, filtered, stripped and dried. It yields 65% conversion of a viscous liquid having an $Mn$ of 990. Infrared analysis shows 1.5% hydroxyl, 0.27% acetylene and 2.0% carbonyl end groups ($Mn$ calculated of 1180). After reduction of the carbonyl end groups and removal of the acetylene end groups by the procedure of Example 4, this product has a hydroxyl content of 2.8% by infrared analysis and is more than 90% double hydroxyl ended.

*Example 12*

Eight-four hundredths part of a copolymer of epichlorohydrin and propylene oxide (45% by weight epichlorohydrin), RSV=4.5, (containing a small amount of Topanol CA stabilizer) is dissolved in 55 parts of dry toluene. A solution of 0.34 part of n-butyllithium in about 2 parts of n-hexane is added at $-78°$ C. The reaction is continued for 6 hours at $-78°$ C., and 11 parts of a 10% aqueous solution of hydrogen chloride is then added. The reaction mixture is warmed to room temperature with stirring, washed neutral with water, filtered, stripped and dried. The yield is 73% conversion of a viscous liquid having an $Mn$ of 975. Infrared analysis shows 1.2% hydroxyl, 0.73% acetylene and 1.6% carbonyl end groups ($Mn$ calculated of 1270). After reduction of the carbonyl end groups and removal of the acetylene end groups by the procedure of Example 4, the product contains 2.5% hydroxyl groups and is more than 90% double hydroxyl ended.

*Example 13*

The procedure of Example 12 is duplicated exactly using 0.84 part of an epichlorohydrin-propylene oxide copolymer (15% by weight epichlorohydrin), RSV of 6.8. The product is 81% conversion of a viscous liquid, having an $Mn$ of 994. Infrared analysis shows 1.3% hydroxyl, 0.62% acetylene and 0.83% carbonyl end groups ($Mn$ calculated of 1530). After reduction of the carbonyl end groups and removal of the acetylene end groups by the procedure of Example 4, more than 80% of the polymer chains are double hydroxyl ended. The product analyzes 1.8% hydroxyl groups.

*Example 14*

The procedure of Example 10 is exactly duplicated in this example, except that 8.2 parts of tert-butyllithium dissolved in 75 parts of n-heptane is substituted for the phenyllithium used in Example 10 as a cleaving agent. The product is 71% conversion of a viscous liquid analyzing 67% epichlorohydrin and having an $Mn$ of 857. Infrared analysis shows 1.4% hydroxyl, 0.49% acetylene, and 1.7% carbonyl end groups ($Mn$ calculated of 1230). After reduction of the carbonyl end groups and removal of the acetylene end groups by the procedure of Example 4, this product analyzes 2.5% hydroxyl groups and is more than 80% double hydroxyl ended.

*Example 15*

The procedure of Example 6 is again repeated, except that as soon as all of the n-butyllithium is added, 500 parts of a 10% aqueous solution of hydrogen chloride is added to the reaction mixture, which is then heated to room temperature, with stirring, washed neutral with water, filtered, stripped and dried to give 63% conversion to a viscous liquid product having an $Mn$ of 1070. Infrared analysis shows 1.5% hydroxyl, 0.33% acetylene and 2.7% carbonyl end groups ($Mn$ calculated 1010). After reduction of the carbonyl end groups and removal of the acetylene end groups by the procedure set forth in Example 4, the product analyzes 2.4% hydroxyl groups and is more than 95% double hydroxyl ended.

A second sample of 23.9 parts of the crude reaction product is reduced for elimination of the carbonyl end groups by adding to this product in 90 parts of dry tetrahydrofurane 1.4 parts of lithium aluminum hydride in 350 parts of dry tetrahydrofurane at 27° C. under nitrogen. This addition takes place over a period of about two minutes, and causes the temperature of the mixture to rise to 31° C. The mixture is stirred for one hour and then worked up by the procedure of Example 4. The product is a viscous liquid (72% epichlorohydrin) analyzing 2.2% hydroxyl groups, 0.34% acetylene groups and no carbonyl groups ($Mn$ calculated of 1420). This product is more than 84% double hydroxyl ended.

Example 16

The procedure of Example 6 is again repeated, except that only 4.1 parts of n-butyllithium is used as the cleaving agent, and it is added over a period of about one hour. The product is 76% conversion of a viscous liquid having an $Mn$ of 1615. Infrared analysis shows 0.95% hydroxyl, 0.11% acetylene and 1.3% carbonyl end groups ($Mn$ calculated of 1830). After reduction of the carbonyl end groups and removal of the acetylene end groups by the procedure set forth in Example 4, the product contains 1.7% hydroxyl groups (by infrared analysis) and more than 95% of the polymer chains of the product are double hydroxyl ended.

Example 17

Two parts of an epichlorohydrin-methyl glycidyl ether copolymer (58% by weight epichlorohydrin), RSV=3.0, is dissolved in about 130 parts of toluene and then cooled to −78° C. At that temperature, 0.41 part of n-butyllithium in 2.5 parts of n-heptane and 30 parts of toluene are added to the copolymer solution over a period of fifteen minutes. The reaction is allowed to continue for 5 hours at −78° C., and then 50 parts of a 10% aqueous solution of hydrogen chloride is added and the reaction mixture warmed to room temperature. The reaction mixture is washed neutral with water, filtered, stripped and dried to give 70% conversion to a viscous liquid product having an $Mn$ of 1770. Infrared analysis shows 1.1% hydroxyl, 0.23% acetylene and 1.2% carbonyl end groups ($Mn$ calculated 1710). After reduction of the carbonyl groups and removal of the acetylene groups by the procedure set forth in Example 4, the product analyzes 1.8% hydroxyl groups by infrared analysis and is more than 95% double hydroxyl ended.

Example 18

The procedure of Example 17 is repeated, using a largely amorphous epichlorohydrin-trimethylene oxide copolymer (24.7% epichlorohydrin by weight), RSV=5.8. The product so prepared is 71% conversion of a viscous mass having an $Mn$ of 2520. Infrared analysis shows 0.90% hydroxyl, 0.33% acetylene and 0.62% carbonyl end groups ($Mn$ calculated from end groups=2260). After reduction of the carbonyl groups and removal of the acetylene groups by the procedure described in Example 4, the product analyzes 1.3% hydroxyl groups by infrared analysis and is more than 95% double hydroxyl ended.

Example 19

Five parts of the epichlorohydrin-ethylene oxide copolymer of Example 6 is dissolved in 137 parts of dry dimethylsulfoxide under a nitrogen atmosphere. A dispersion of 0.16 part of sodium methoxide in 10 parts of dimethylsulfoxide is added to the copolymer solution, and the mixture heated at 65° C. for 6.3 hours, with agitation. Four parts of anhydrous ethanol are then added, the mixture cooled, and 30 parts of a 3% aqueous solution of hydrogen chloride added, followed by two volumes of water. The insoluble portion of the product is collected, washed neutral with water and dried for 16 hours under a reduced pressure, at 80° C., to give 3.84 parts (77% conversion) of a tacky mass containing 19.5% epichlorohydrin having an $Mn$ of 4590. Infrared analysis shows 0.35% hydroxyl, 0.82% carbonyl and no acetylene end groups ($Mn$ calculated of 4000). After reduction of the carbonyl groups by the procedure set forth in Example 4, more than 95% of the polymer chains are double hydroxyl ended.

Example 20

The procedure of Example 19 is repeated, except that 0.115 part of pulverized sodium hydroxide is substituted for the sodium methoxide cleaving agent used in Example 19. The product is 2.69 parts (54% conversion) of a tacky mass, having an $Mn$ of 6300. Infrared analysis shows 0.22% hydroxyl, 0.30% carbonyl and no acetylene end groups ($Mn$ calculated of 8500). After reduction of the carbonyl end groups by the procedure of Example 4, more than 90% of the polymer chains of the product are double hydroxyl ended.

The fraction of the product which is soluble in the hydrogen chloride solution is recovered by dialyzing neutral with water, stripping and drying. The resulting product is 1.62 parts (32.5% conversion) of a tacky mass, having an $Mn$ of 4000. Infrared analysis shows 0.31% hydroxyl, 0.58% carbonyl and no acetylene end groups ($Mn$ calculated of 5150). After reduction of the carbonyl groups by the procedure of Example 4, the product is more than 90% double hydroxyl ended.

Example 21

To a solution of 0.65 part of an epichlorohydrin-tetrahydrofurane copolymer (containing 22.4% epichlorohydrin and 0.05% hydroxyl groups), RSV of 0.34 in α-chloronaphthalene at 100° C., (prepared by phosphorous pentafluoride catalysis of an equi-weight mixture of the monomers at 0–25° C.) in 42 parts of toluene is added 0.64 part of n-butyllithium in 3.9 parts of n-hexane at −78° C. under a nitrogen atmosphere. The reaction is allowed to continue for 23 hours at −78° C. and then 8 parts of 10% aqueous hydrogen chloride is added, the reaction mixture warmed to room temperature, washed neutral, filtered, stripped and dried.

The product is 0.70 part of a viscous liquid having an $Mn$ of 1227. Infrared analysis shows 2.0% hydroxyl, 0.84% acetylene and 2.4% carbonyl end groups ($Mn$ calculated of 843). Following reduction of the carbonyl groups and removal of the acetylene groups by the procedure of Example 4, the product analyzes 3.5% hydroxyl groups and is more than 80% double hydroxyl ended.

The foregoing examples demonstrate the production of a wide variety of low molecular weight epihalohydrin polyether copolymers having hydroxyl end groups at both ends of the polymer chains. Thus this invention provides a ready source of hydroxyl-ended polymers, which are useful in the preparation of cross-linked, foamed articles of good mechanical properties, and in the preparation of superior elastomeric fibers. It is well known that liquid, amorphous, low molecular weight poly(propylene glycols) and/or propylene oxide adducts of polyols have proven of great value when chain extended. The hydroxyl-ended products produced by this invention can also be used in chain extension reactions. The chain extending agent can be any polyfunctional compound which reacts under appropriate temperature, pressure and catalyst with hydroxyl groups. They can be di- or polyisocyanates such as m- or p-phenylene diisocyanate, 2,4-toluene diisocyanate, 1,5-naphthyl diisocyanate, methylene di(p-phenyl diisocyanate), hexamethylene diisocyanate, triphenyl methane triisocyanate, etc.; di- or polyepoxides such as Epon resins as, for example, the diglycidyl ether of Bisphenol A, or di- or triaziridines as, for example, tris[1-(2-methyl)aziridinyl] phosphine oxide, tris (1-aziridinyl) phosphine oxide, or di- or poly-anhydrides such as pyromellitic anhydride, or di- or polyimides such as phenylene bis-maleimide, etc. The difunctional chain extending agents are generally used in approximately stoichiometric amounts to the hydroxyl chain ends when a linear, soluble high polymer product is desired. When the chain extending agent contains more than 2 functional groups and is used in approximately stoichiometric amounts to the hydroxyl chain ends the product is generally a cross-linked product. Alternatively, a cross-linked network can be obtained by using a combination of a difunctional hydroxyl chain end polymer with low molecular weight similar polyreactive compounds. Thus, polymers with hydroxyls on both ends of the polymer chain in combination with a polyol such as glycerin, pentaerythritol, trimethylol propane, sorbitol, tetrakis(2-hydroxypropyl) ethylene diamine, or ethylene oxide or propylene oxide adducts of these polyols in combination with the diisocyanate will yield a cross-linked polyurethane network.

Cross-linked or chain-extended products prepared by the use of the hydroxyl-ended copolymers of this invention can advantageously include fillers (such as silicas, aluminas, clays, etc.), antioxidants, stabilizers, plasticizers, acid acceptors, and the like.

The hydroxyl chain-ended polymers of this invention are also very useful for preparing block copolymers particularly for the combination of dissimilar blocks as, for example, the preparation of block copolymers containing blocks of crystalline poly(propylene oxide) or crystalline poly(trans- or cis-butene-2 oxide) combined with amorphous epichlorohydrin-ethylene oxide blocks, which block copolymers are particularly useful in conventional polyurethane foam technology to yield foams of improved strength, abrasion resistance, hardness and rigidity, depending, of course, on the composition of the block copolymer.

The diol cleavage products of this invention can also be converted to useful polyester block copolymers by the usual polyester and forming reactions, using either a simple monomeric unit such as the phthalic acids or esters, or using preformed polyesters with appropriate reactive chain ends.

The products of this invention are entirely new polyether copolymers with hydroxyls at both ends. When appropriately modified to high polymers, these products contribute improved solvent resistance, improved flame resistance, greater resistance to heat, light and ozone, and lower air permeability, when compared to the previously available products based on poly(propylene glycol). These new products are particularly useful as elastomeric type products in polyurethane foams, fibers, coatings and molded articles. After reaction with diisocyanates, and hydrazines and/or diamines, followed by spinning, they yield greatly improved elastomeric fibers. The preparation of such materials from the instant copolymers will be illustrated by the specific examples set forth hereinafter.

Many other uses of the cleavage products of this invention can be cited. Thus, the hydroxyl chain end polymers can be used as a base for improved coatings, sealants, adhesives, cast rubbers, elastomeric films and fibers and the like. They can be prereacted with reactive agents such as diisocyanate, phosgene, dianhydrides, etc., and then reacted with other difunctional or polyfunctional agents such as water, polyols, polyamines, etc., to form useful high polymers. For example, a hydroxyl-ended polymer reacted with phosgene yields a chloroformate which can be converted to a polyamide by reacting with a diamine by the well-known method of interfacial polymerization. Another example is the reaction of the hydroxyl chain ends with acrylonitrile to give cyanoethyl end groups which can then be reduced to amino groups and used for subsequent reaction or polymerization. The hydroxyl end groups of the instant copolymers can also be converted, if desired, to other types of end groups which are useful in various types of chain extension and/or cross-linking reactions. For example, they can be converted to epoxide, carboxyl, amine, imine or mercaptan groups, etc.

Carboxyl end groups can be obtained by reacting the hydroxyl end groups with a cyclic anhydride, such as maleic anhydride, succinic anhydride, phthalic anhydride or the like, or with propiolactone or the like. Such carboxyl-ended products can be chain extended or cross-linked with metal salts.

Modification of the instant hydroxyl-ended copolymers to produce mercaptan end groups yields products which are particularly useful in sealants. Such modifications is accomplished by reacting the hydroxyl end groups with an episulfide such as ethylene sulfide, propylene sulfide or the like under acid or base catalysis conditions.

The hydroxyl end groups of the instant copolymers can also be modified to produce copolymers having cyclic imine end groups. This is accomplished by reacting a cyclic imine, such as ethylene imine, propylene imine, etc., with a diisocyanate such as toluene diisocyanate or the like, and reacting the product of that reaction with the hydroxyl end groups through the isocyanate group to produce a product having cyclic imine end groups. Products with such end groups can be used for chain extension or cross-linking with di- or poly-reactive compounds, such as dicarboxylic acids, anhydrides, etc.

Epoxide end groups can be obtained by reacting the hydroxyl end groups with epichlorohydrin or the like in the presence of an acid catalyst, such as boron trifluoride etherate, and subsequently applying a base treatment to the resulting product.

Other applications and uses for these cleavage products will be readily apparent to those skilled in the art from the above disclosure.

*Example 22*

Seven parts of the 78% double hydroxyl-ended intermediate product of Example 1 is mixed with 1.38 parts of methylene di-p-phenyl diisocyanate in a closed vessel under a nitrogen atmosphere. This mixture is heated at 80° C. for three hours, cooled, and 19 parts of dry dimethyl formamide added thereto, with agitation, to form a solution. When the solution is obtained, it is cooled to 0° C. and 2.0 parts by volume of a solution of 0.852 part of 95% hydrazine in 18.1 parts of dimethyl formamide is added thereto. This mixture is agitated overnight at 30° C. and a viscous solution is then precipitated therefrom with ten volumes of water. The insoluble portion of this product is collected, washed three times with water and dried at 80° C. in vacuo for 16 hours. The resulting product is 8.5 parts of an amorphous, rubbery solid which is soluble in dimethyl formamide and has an RSV of 0.26 (0.1% in hexamethylphosphoramide at 25° C.).

*Example 23*

Seven parts of the heptane-insoluble portion of the product of Example 22 ($Mn=835$, chlorine content=27.0%, hydroxyl content=3.8%) is mixed with 3.92 parts of methylene di-p-phenyl diisocyanate in a closed vessel under nitrogen. This mixture is treated by exactly the same procedure used in Example 24, except that 4.32 parts by volume of the hydrazine solution is used herein in place of the 2.0 parts by volume used in Example 24. The final reaction mixture is a viscous liquid, and the separated and dried insoluble portion thereof is 10.1 parts of a tough, somewhat rubbery solid, amorphous by X-ray, having an RSV of 1.00 in hexamethylphosphoramide at 25° C. This product is compression molded at 150° C. for two minutes, and cooled under pressure, to yield a tough, flexible film.

*Example 24*

The procedure of Example 25 is repeated exactly, except that 0.66 part of toluene diisocyanate (a commercial mixture consisting of the 2,4- and 2,6-isomers in an 80:20 ratio) is substituted for the 3.92 parts of the methylene di-p-phenyl diisocyanate used in Example 25. After heating this mixture for three hours at 80° C. and cooling in accordance with the procedure of Example 25, 2.97 parts of methylene di-p-phenyl diisocyanate is added, the mixture reheated for three hours at 80° C., and cooled. Then the procedure of Example 25 is followed until the final viscous liquid reaction product is obtained. This product is washed with 0.1% Santonox (4,4'-thiobis-(6-t-butyl-m-cresol)) in methanol, and dried. The product is 10.6 parts of a tough, somewhat rubbery solid, having an RSV in hexamethylphosphoramide at 25° C. of 0.29. After subjecting this product to comprssion molding in the same manner as in Example 25, a tough, flexible film is obtained.

Example 25

The final hydroxyl-ended copolymer product of Example 15 (first sample, hydroxyl content=2.4%) is subjected to the same procedure used in Example 25, except that 2.54 parts of methylene di-p-phenyl diisocyanate is used herein (rather than the 3.92 parts used in Example 25), and 2.8 parts by volume of a solution of hydrazine-hydrate (prepared from 1.30 parts by weight of hydrazine-hydrate and 17.6 parts dry dimethyl formamide) is substituted for the 4.32 parts by volume of hydrazine solution used in Example 25. The final viscous reaction product is extruded into water to yield, on drying, a strong elastomeric fiber having excellent solvent resistance.

What I claim and desire to protect by Letters Patent is:

1. A low molecular weight copolymer of an epihalohydrin and at least one comonomer selected from the group consisting of an alkylene oxide, an oxetane and a tetrahydrofurane, said copolymer being characterized by having a number average molecular weight between about 500 and about 10,000 and by having predominately double hydroxyl-ended polymer chains.

2. The composition of claim 1 wherein at least about 80% of the polymer chains of said copolymer are double hydroxyl ended.

3. The composition of claim 2 wherein at least 90% of the polymer chains of said copolymer are double hydroxyl ended.

4. The composition of claim 1 wherein said copolymer has a number average molecular weight between about 1000 and about 5000.

5. The composition of claim 1 wherein said epihalohydrin is epichlorohydrin.

6. The composition of claim 5 wherein said comonomer is an oxetane.

7. The composition of claim 5 wherein said comonomer is a tetrahydrofurane.

8. The composition of claim 5 wherein said comonomer is an alkylene oxide.

9. The composition of claim 8 wherein said alkylene oxide is propylene oxide.

10. The composition of claim 8 wherein said alkylene oxide is ethylene oxide.

11. The composition of claim 10 wherein said copolymer has a number average molecular weight between about 1000 and about 5000.

12. The composition of claim 10 wherein said copolymer contains about 20–80% epichlorohydrin and about 80–20% ethylene oxide.

No references cited.

W. H. SHORT, *Primary Examiner.*

T. E. PERTILLA, *Assistant Examiner.*